US008468665B2

(12) United States Patent
Chen

(10) Patent No.: US 8,468,665 B2
(45) Date of Patent: Jun. 25, 2013

(54) METHODS FOR MAKING CAPACITIVE MICROPHONE

(75) Inventor: Jen-Yi Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 200 days.

(21) Appl. No.: 13/027,457

(22) Filed: Feb. 15, 2011

(65) Prior Publication Data

US 2011/0131794 A1 Jun. 9, 2011

Related U.S. Application Data

(62) Division of application No. 11/541,632, filed on Oct. 3, 2006, now Pat. No. 7,912,235.

(30) Foreign Application Priority Data

Dec. 30, 2005 (TW) .............................. 94147532 A

(51) Int. Cl.
*H01G 7/00* (2006.01)

(52) U.S. Cl.
USPC .......... 29/25.42; 29/594; 29/602.1; 29/609.1; 310/311; 310/333; 310/357; 310/367; 347/54; 347/68; 347/69; 347/70; 347/71

(58) Field of Classification Search
USPC .................. 29/25.35, 592.1, 594, 602.1, 609, 29/609.1, 856, 868; 310/311, 333–337, 357, 310/367; 347/54, 68, 69, 70, 71, 72, 311, 347/333–337, 357, 367
See application file for complete search history.

(56) References Cited

U.S. PATENT DOCUMENTS

| | | | | |
|---|---|---|---|---|
| 5,146,435 | A | 9/1992 | Bernstein | |
| 5,889,872 | A | 3/1999 | Sooriakumar et al. | |
| 6,535,460 | B2 | 3/2003 | Loeppert et al. | |
| 6,847,090 | B2 | 1/2005 | Loeppert | |
| 2006/0008098 | A1 * | 1/2006 | Tu | 381/175 |
| 2006/0280319 | A1 | 12/2006 | Wang et al. | |

FOREIGN PATENT DOCUMENTS

| | | |
|---|---|---|
| CN | 1658738 A | 8/2005 |
| DE | 4329993 | 3/1995 |
| JP | 11-127498 | 5/1999 |

* cited by examiner

*Primary Examiner* — Paul D Kim
(74) *Attorney, Agent, or Firm* — Rabin & Berdo, P.C.

(57) ABSTRACT

A method of manufacturing a capacitive microphone comprises providing a substrate having at least one cavity. The method further comprises forming a backplate on the substrate, wherein the backplate has a plurality of holes, and forming a diaphragm on the backplate, wherein there are a first distance and a second distance between the diaphragm and the backplate. The method still further comprises forming an air gap between the backplate and the diaphragm through the first distance, and fastening the diaphragm to the backplate through the second distance.

16 Claims, 14 Drawing Sheets

METHODS FOR MAKING CAPACITIVE MICROPHONE

CROSS-REFERENCE TO RELATED APPLICATIONS

This application is a divisional patent application of U.S. application Ser. No. 11/541,632 filed on Oct. 3, 2006, now U.S. Pat. No. 7,912,235, the entire contents of which are hereby incorporated by reference for which priority is claimed under 35 U.S.C. §120. This non-provisional application claims priority under 35 U.S.C. §119(a) on Patent Application No(s). 094147532 filed in Taiwan, R.O.C. on Dec. 30, 2005, the entire contents of which are hereby incorporated by reference.

BACKGROUND OF THE INVENTION

1. Field of Invention

The present invention relates to a method for making a microphone, and more particularly, to method for making a capacitive microphone.

2. Related Art

Most micro capacitive microphones are manufactured through film processes. The remaining stress on the film limits the sensitivity of the microphone to a great extent, which can be released effectively by way of single-end support. However, the microphone is a structure with the surrounding parts being fastened during operation, so additional fastening structure designs are required.

As for U.S. Pat. No. 6,535,460, the backplate is located at the top of the structure, and contacts with the polysilicon diaphragm via the supporting structure. The backplate must be a nonconductor, and another layer of conductive material is required to form the top electrode.

As for U.S. Pat. No. 5,146,435, a thick plate structure suspended by a spring structure is used instead of the conventional diaphragm, to form a parallel plate movement under the effects of sound pressure.

SUMMARY OF THE INVENTION

A main object of the present invention is to provide a capacitive microphone and method for making the same, wherein the diaphragm is fastened through the surface stiction generated on the surface of the backplate due to mist, so as to solve the problems in the prior art.

The capacitive microphone comprises a substrate, a backplate, and a diaphragm. The substrate has one or more cavities. The backplate is formed on the substrate and has multiple holes. The diaphragm is formed above the backplate. There are a first distance and a second distance between the diaphragm and the backplate, wherein the first distance is greater than the second distance.

Through the first distance, an air gap is formed between the backplate and the diaphragm, and through the second distance, the diaphragm is fastened through the surface stiction with the backplate generated due to mist. The air gap and the cavity communicate with each other by each hole.

On another aspect, a method of manufacturing the capacitive microphone of the present invention is provided. First, a substrate with at least one cavity is provided. Then, a backplate with a plurality of holes is formed on the substrate. Finally, a diaphragm is formed above the backplate, and there are at least a first distance and a second distance between the diaphragm and the backplate, wherein through the first distance, an air gap is formed between the backplate and the diaphragm; and through the second distance, the diaphragm is fastened through the surface stiction with the backplate generated due to mist. The air gap, the cavity, and each hole communicate with each other.

The diaphragm can be particularly shaped as a round cap. During the drying process of the sacrificial layer after being wet etched, the surface stiction occurs, which is used for fastening the diaphragm. The sacrificial layer at the external periphery is relatively thin, so surface stiction will occur here. The distance between the middle diaphragm and the bottom electrode is relatively high, and there are dimples distributed there-between, thus avoiding the stiction. Annular supporting wall can be further disposed onto the diaphragm. The shape surrounded by the annular supporting wall is the same as that of the air gap. The edge of the air gap can be shaped into an ideal circle by particular design. That is, the edge of the diaphragm is made to be an ideal circle. Of course, another shape, e.g., a square also can be used. The annular supporting wall and the bottom electrode backplate can be fastened via the electrostatic adhesion generated due to the externally-applied bias. In order to prevent the external ring part from drifting during the drying process, the fastening pile can be additionally disposed adjacent to the external ring part, to ensure the relative position of the diaphragm and the bottom electrode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

In order to further understand objects, constructions, features, and functions of the present invention, detailed descriptions are given below with embodiments. It is to be understood that both the foregoing general description and the following detailed description are exemplary, and are intended to provide further explanation of the present invention as claimed.

Figure 1:
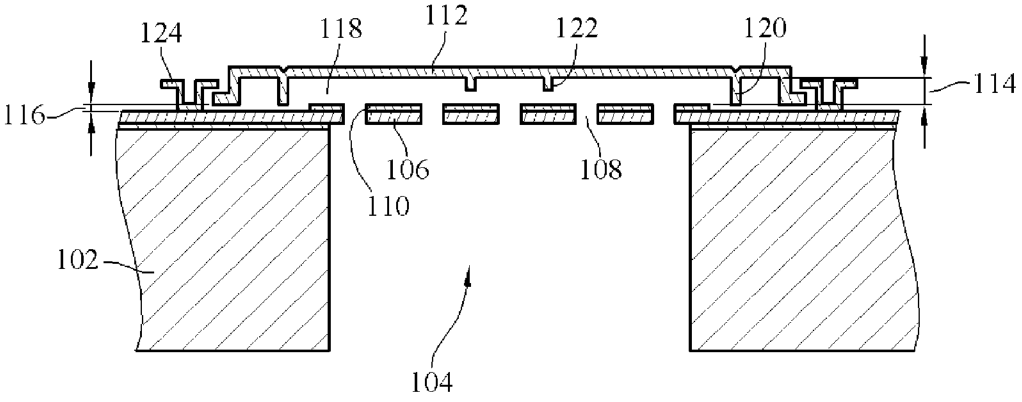
FIG. 1 is a cross-sectional structural view of the capacitive microphone of the present invention.
Figure 2A:
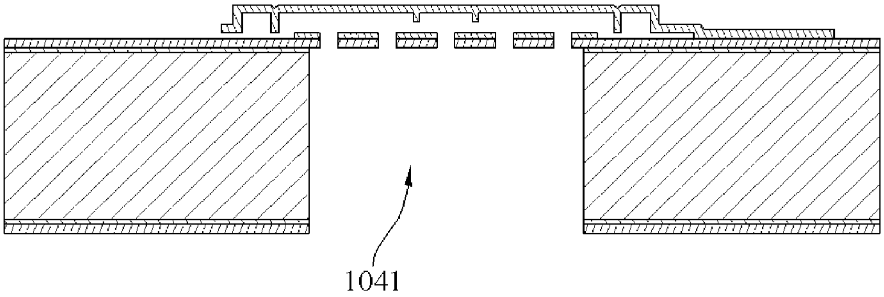
FIG. 2A is a schematic view of the cavity with a shape of vertical round hollow.
Figure 2B:
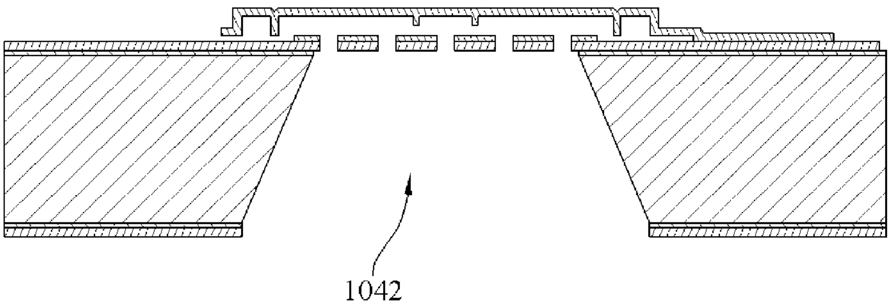
FIG. 2B is a schematic view of the cavity with a shape of inclined surface square hollow.

Referring to FIG. 1, it is a cross-sectional structural view of the capacitive microphone of the present invention. A substrate 102, which can be a silicon wafer and has a cavity 104, is provided. As shown in FIG. 2A, a cavity 1041 shaped into a vertical round hollow can be formed by Inductive Couple Plasma (ICP) dry etching. As shown in FIG. 2B, a cavity 1042 shaped into an inclined surface square hollow is formed by silicon anisotropy wet etching. A backplate 106 is disposed on the substrate 102, and the backplate 106 comprises a plurality of holes 108. An electrode layer 110 made of conductive materials is further disposed on the surface of the backplate 106. A diaphragm 112 made of conductive materials is disposed above the backplate 106; and a first distance 114 and a second distance 116 are formed between the diaphragm 112 and the backplate 106. Thus, a step-shaped difference is formed by the first distance 114 and the second distance 116.

By the first distance 114, an air gap 118 is formed between the backplate 106 and the diaphragm 112 through wet etching. By the second distance 116, the diaphragm 112 is fastened through the surface stiction with the backplate 106 generated due to mist. The surface stiction occurs due to the surface tension of fluids, mainly including the Van der Waals force and the effect of hydrogen bonds. If dry etching is used in the manufacturing process, and the density of mist in the air is relatively high, the second distance 116 area can be fastened through the surface stiction with the backplate 106 generated due to mist in the air. The air gap 118 and the cavity 104 communicate with each other by each hole 108.

Further, in the structure of the capacitive microphone, the shape of the air gap 118 can be round or square. The diaphragm 112 can be further provided with a supporting wall structure 120 with the same shape as that of the air gap 118 (round or square). Also, the supporting wall structure 120 and the backplate 106 can be fastened with each other through the electrostatic adhesion generated by the applied bias. For example, by applying a DC power, the supporting wall structure 120 can be fastened onto the backplate 106, and the second distance 116 between the diaphragm 112 and the backplate 106 can be reduced to the distance for generating the surface stiction.

Additionally, the diaphragm 112 further comprises a dimple 122 used to reduce the probability of sticking with the backplate 106, such that the whole surface of the diaphragm 112 will not stick onto the backplate 106 during the drying process of wet etching. With the design of the dimple 122, the point contact at most occurs between the diaphragm 112 and the backplate 106 during the drying process of wet etching, such that it is much easier to separate the diaphragm 112 from the backplate 106. The length of the dimple 112 is shorter than the first distance 114.

Figure 3A:
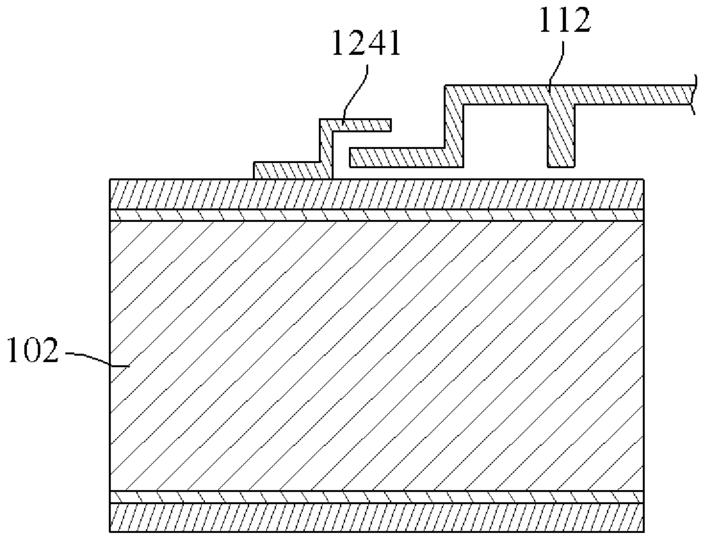
FIG. 3A is a structural aspect of the first step-shaped fastening pile.
Figure 3B:
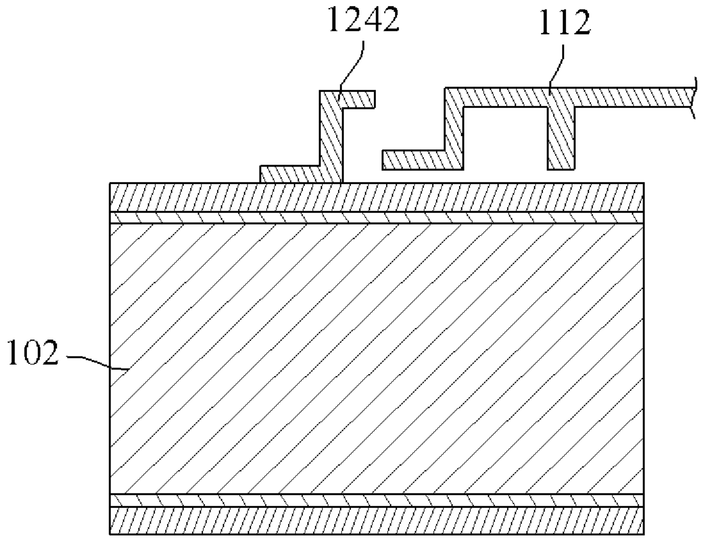
FIG. 3B is a structural aspect of the second step-shaped fastening pile.
Figure 3C:
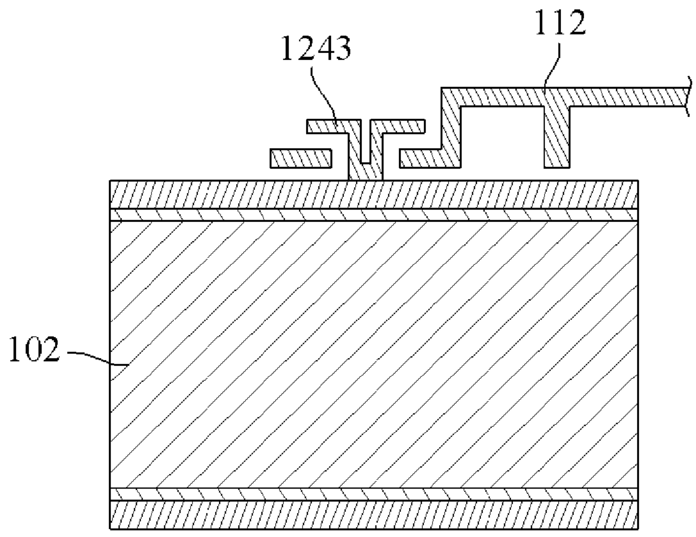
FIG. 3C is a structural aspect of the first cap-shaped fastening pile.
Figure 3D:
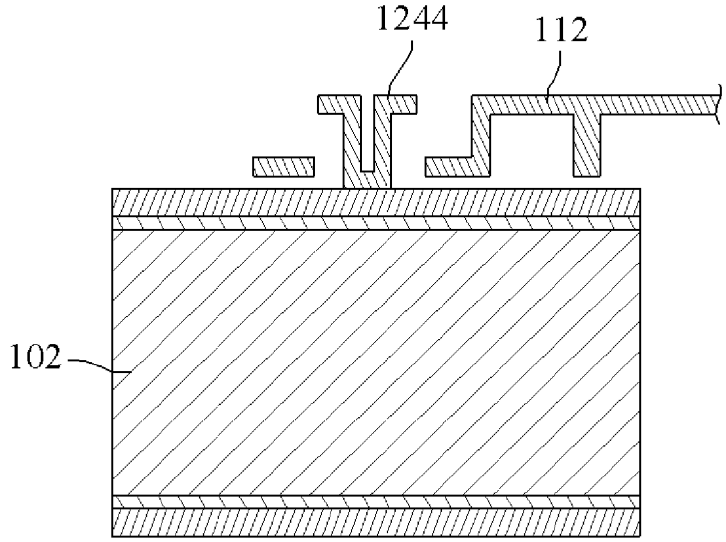
FIG. 3D is a structural aspect of the second cap-shaped fastening pile.
Figure 4A:
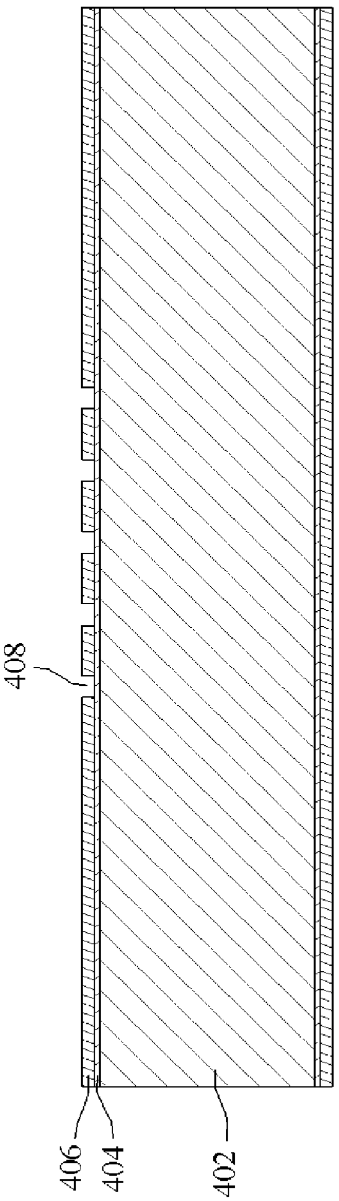
FIGS. 4A to 4L are schematic views of the manufacturing flow of the capacitive microphone according to a first embodiment of the present invention.
Figure 4B:
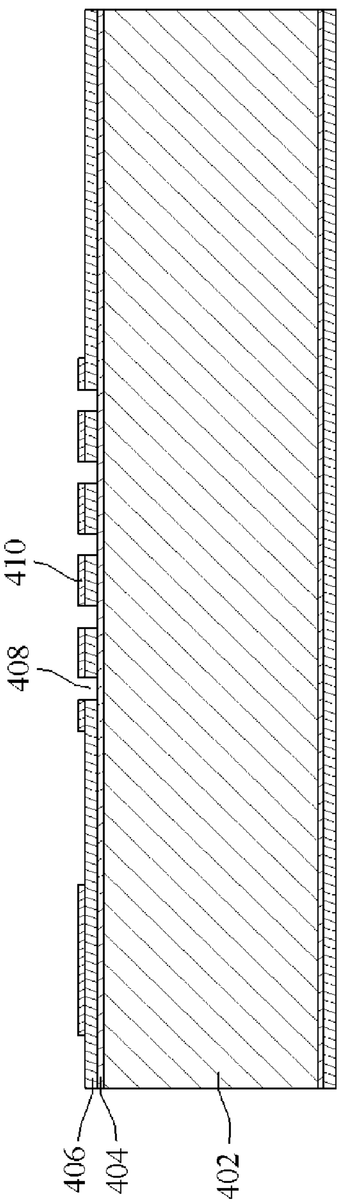
Figure 4C:
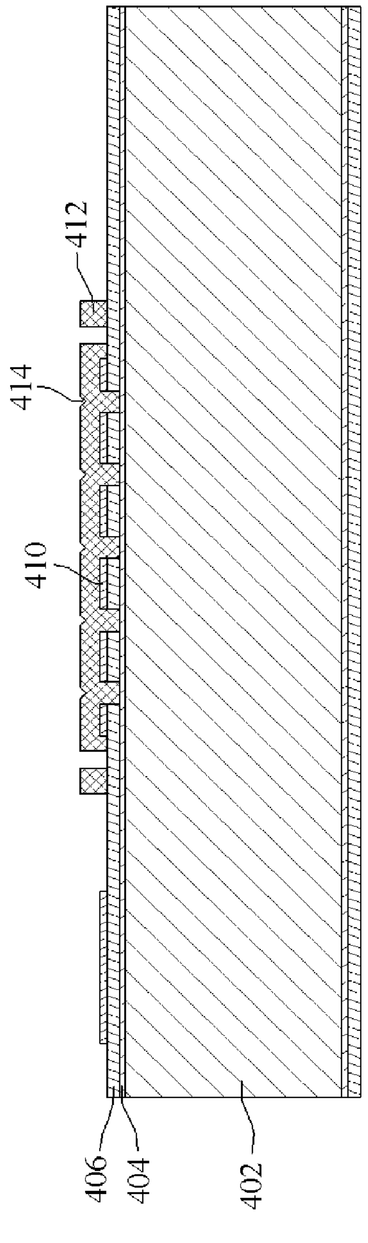
Figure 4D:
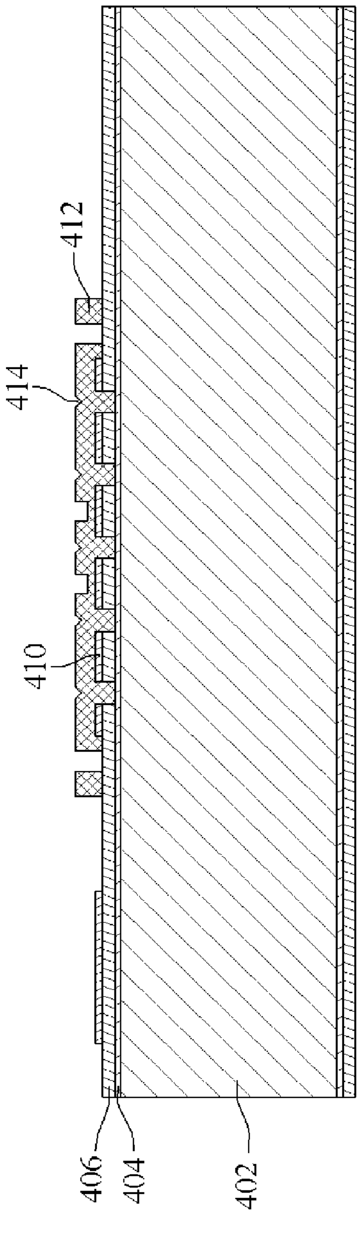
Figure 4E:
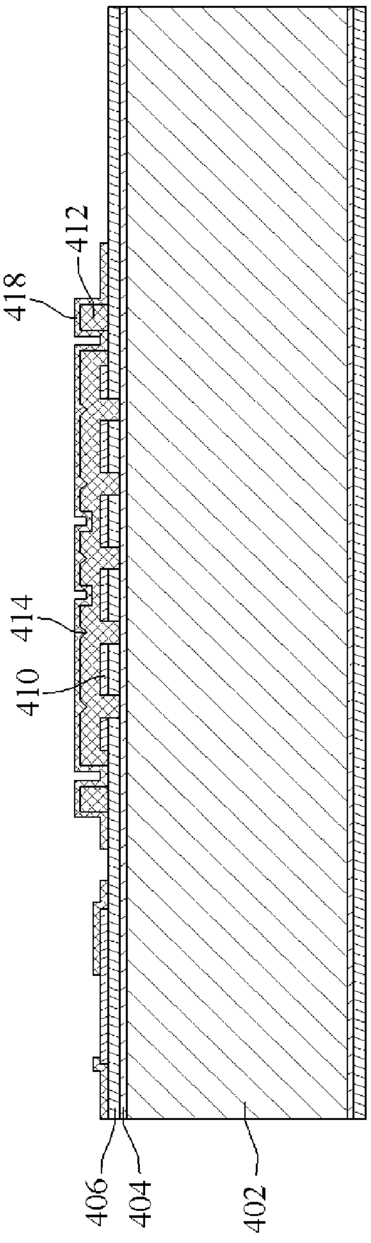
Figure 4F:
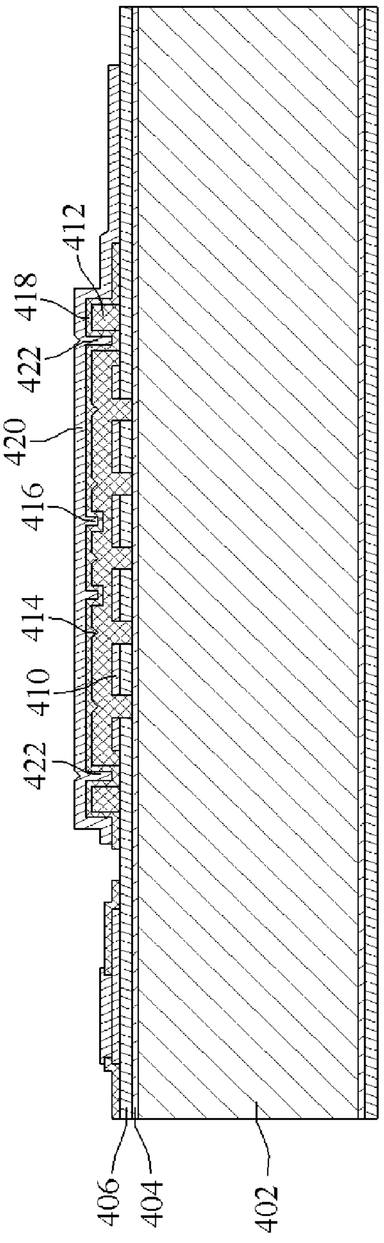
Figure 4G:
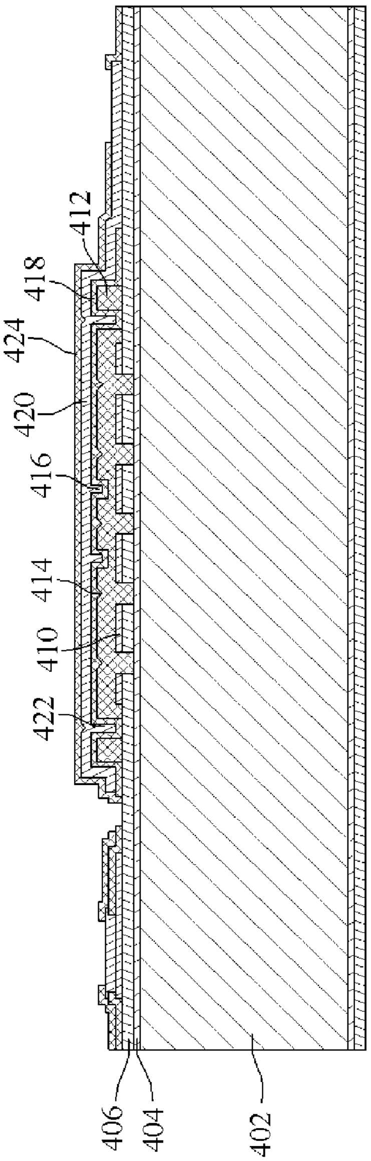
Figure 4H:
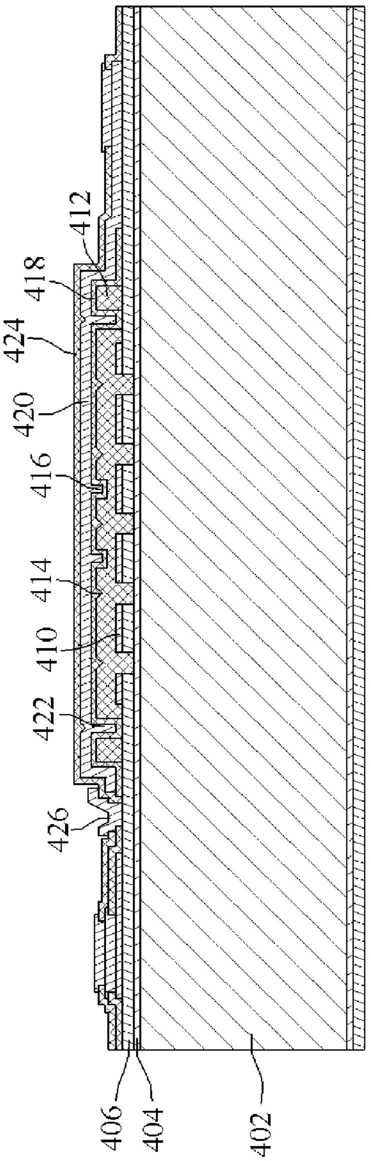
Figure 4I:
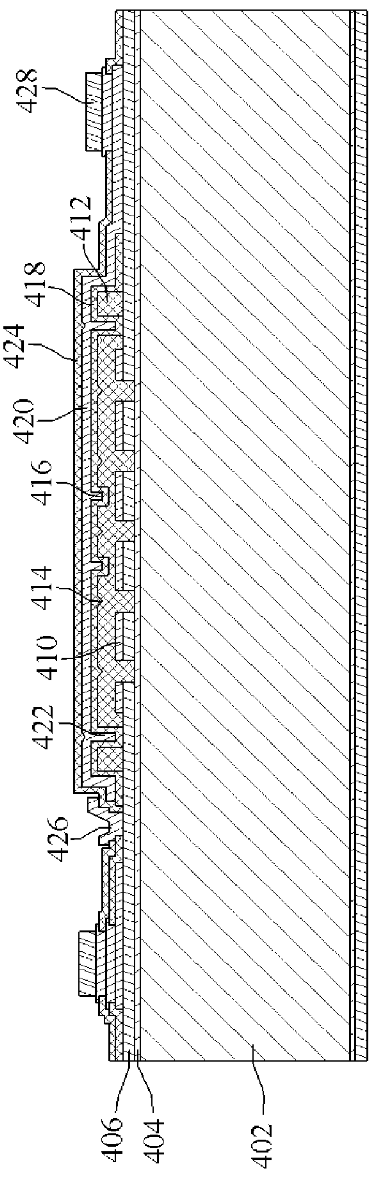
Figure 4J:
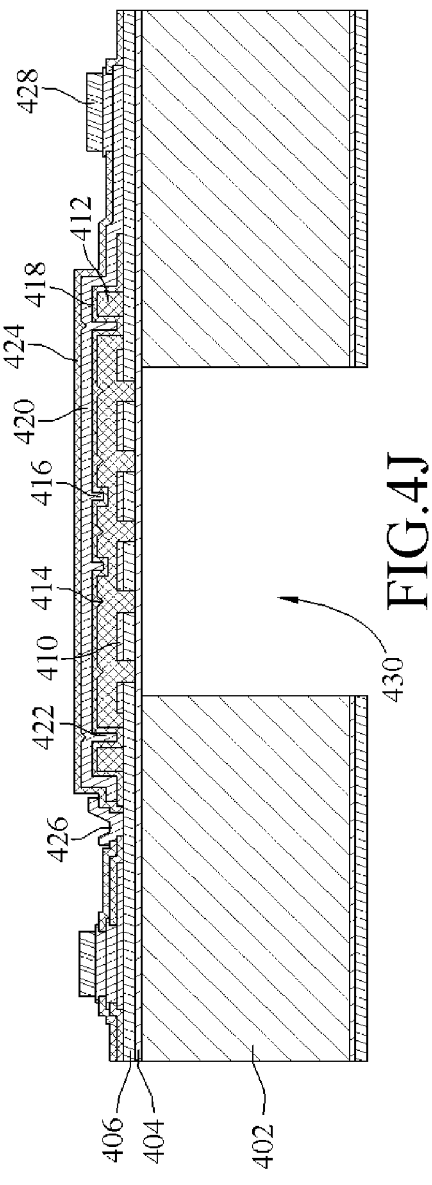
Figure 4K:
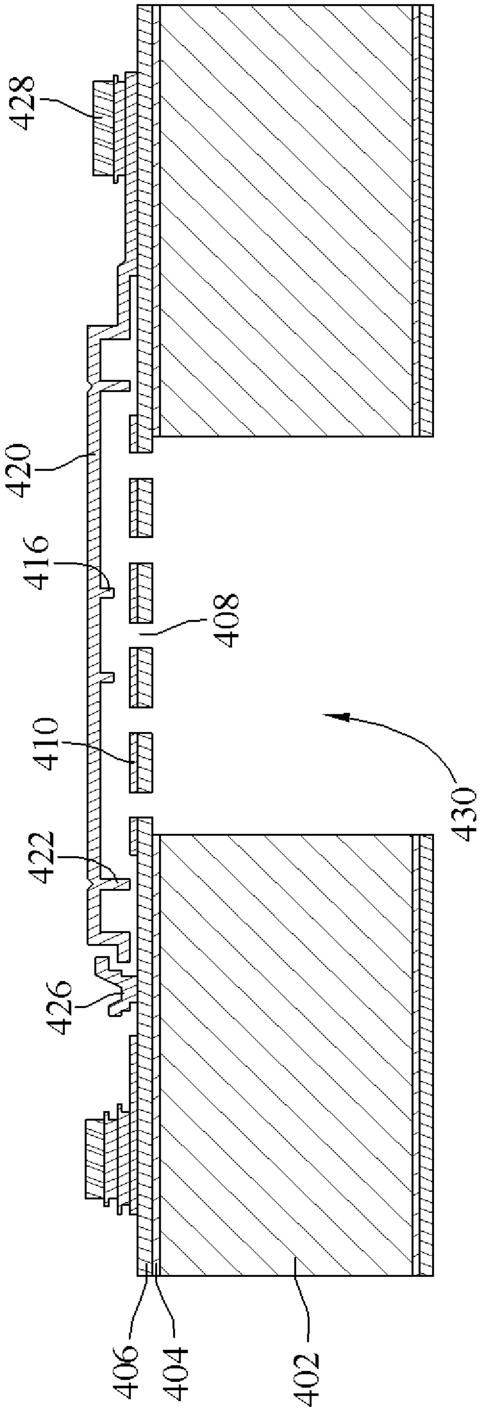
Figure 4L:
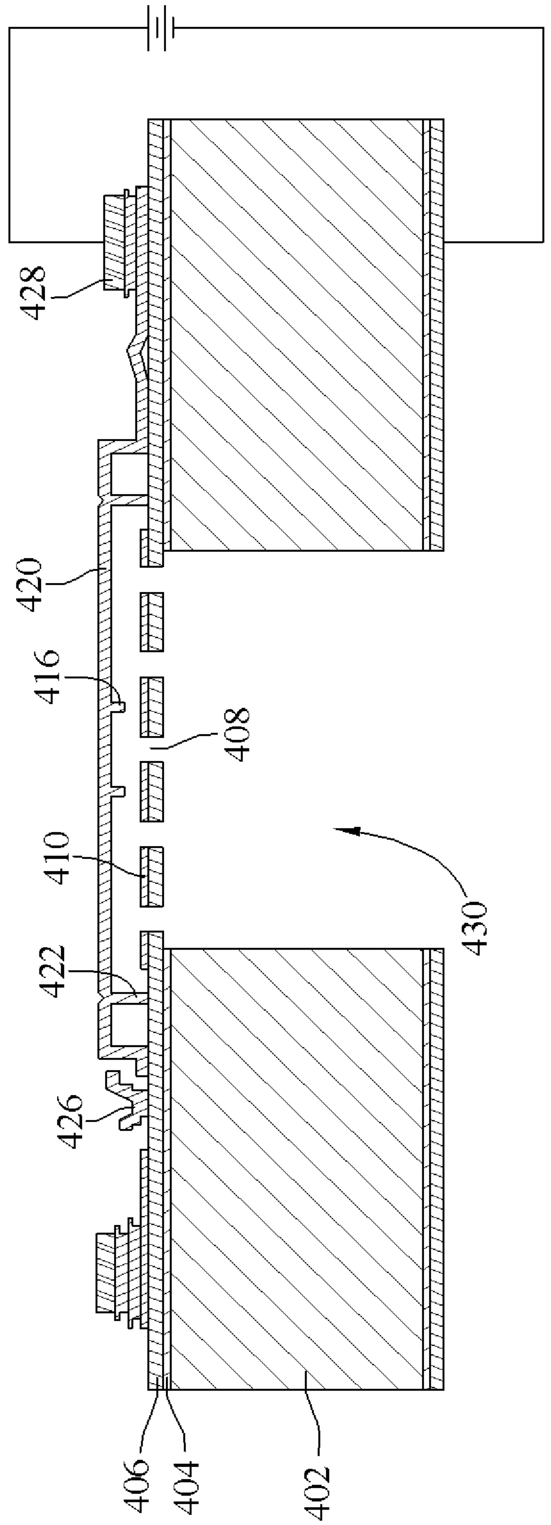

Also, in order to ensure that the diaphragm 112 is located onto the backplate 106, a fastening pile 124 is further provided at the periphery of the diaphragm 112, so as to ensure the relative position of the diaphragm 112 and the backplate 106. The fastening pile 124 is step-shaped or cap-shaped. FIG. 3A shows a structural aspect of the first step-shaped fastening pile 1241. The diaphragm 112 will be more stable in the upper and lower direction with the first step-shaped fastening pile 1241. FIG. 3B shows a structural aspect of the second step-shaped fastening pile 1242. FIG. 3C shows a structural aspect of the first cap-shaped fastening pile 1243. The most desirable fastening effect is achieved by the diaphragm 112 with the first cap-shaped fastening pile 1243, wherein the moving space of the diaphragm 112 in the upper, lower, left, and right directions are all limited. FIG. 3D shows a structural aspect of the second cap-shaped fastening pile 1244.

Referring to FIGS. 4A to 4L, they are schematic views of the manufacturing flow of the capacitive microphone according to the first embodiment of the present invention. First, a thermal silicon dioxide layer 404 (1000 Å) is grown on a clean double-face polishing silicon wafer 402. Next, $Si_3N_4$ 406 (about 5000 Å) is deposited by the low pressure chemical vapor deposition (LPCVD). Then, a pattern of acoustic holes 408 is defined by the first mask. Then, reactive ion etching (RIE) is carried out until the silicon substrate is exposed. Therefore, the acoustic holes 408 are formed.

Then, a doped polysilicon (about 3000 Å) is deposited by the LPCVD. The polysilicon is conductive. Next, the pattern of the bottom electrode 410 is defined on the polysilicon by the second mask that is the same as the first mask, and undesirable parts can be etched off by the isotropic silicon etchant, so as to form the bottom electrode 410.

Later, the first sacrificial layer 412 is formed by depositing the Low-Temperature Oxide (LTO) or Phosphorous Silicate Glass (PSG) via furnace tube. A corrugation region 414, a dimple 416, and a supporting structure 422 are defined by the third mask. Then, the undesirable parts are etched off by HF acid. Then, the second thin sacrificial layer 418 used for decoration is formed by depositing the Low-Temperature Oxide (LTO) or Phosphorous Silicate Glass (PSG) via furnace tube. The dimple 416 and the supporting structure 422 are defined by the fourth mask. And, the undesirable parts are etched away by HF acid.

Then, the doped polysilicon is deposited by the LPCVD, so as to form the diaphragm 420. The diaphragm 420 has dimples 416 and a supporting structure 422. Then, the third thin sacrificial layer 424 is further deposited continuously to define the shape of the fastening pile 426. The polysilicon is filled into the part of the fastening pile 426 through isotropic uniform deposition. The pattern of the diaphragm 420 is defined by the fifth mask, and the ICP silicon deep etcher is used for etching and sputter deposition of TiW/Au. The metal wire and the bonding pad 428 serving for wiring later are defined by the sixth wet etching, and the Au etchant and TiW etchant are respectively used for etching. The back-side etching region 430 is defined by the seventh mask. Because the selection ratio of the ICP silicon deep etching to that of the silicon dioxide is over 1000, the back-side etching can be uniformly stopped on the backplate. Then, the first sacrificial layer 412, the second sacrificial layer 418, and the third sacrificial layer 424 are removed through HF wet etching. Finally, the super criticality of $CO_2$ is used for the drying process.

After the drying process, a bias is applied on the silicon wafer 402 under the controlling atmosphere of high moisture and viscous gases. Then, the edge of the diaphragm 420 and the supporting structure 422 adhere to the surface of the backplate, and the stiction phenomenon occurs at the same time. Finally, the applied bias is removed and the silicon wafer 402 is drawn out from the controlling atmosphere to complete the process flow.

The stiction occurs due to the surface tension of the fluids, mainly including the Van der Waals force and the effect of hydrogen bonds. During the drying process of the fluid, the distance between the flexible structures is drawn close. When the elastic-restoring force of the structure is smaller than the surface adhesion, the stiction will occur. The stiction is generally reduced by enlarging the structural gap, providing the dimples, and increasing surface hydrophobicity. In this embodiment, the initial distance between the external ring part and the surface of the wafer is only 0.1 to 0.3 μm, and the surface is smooth. The stiction occurs on the structure surface due to specific design. The height of the diaphragm 420 and the bottom electrode 410 is 3 to 4 μm, and a dimple 416 with the height of 1 μm is arranged at the center of the diaphragm 420. Therefore, after the drying process, the stress for the diaphragm 420 can be thoroughly released, and a bias is applied on the silicon wafer 402 under the controlling atmosphere so that the eternal ring part will be stuck and fasten on the surface of the wafer. Thus, the remaining stress can be totally released, and the edge of the diaphragm 420 can be re-fastened automatically.

Figure 5A:
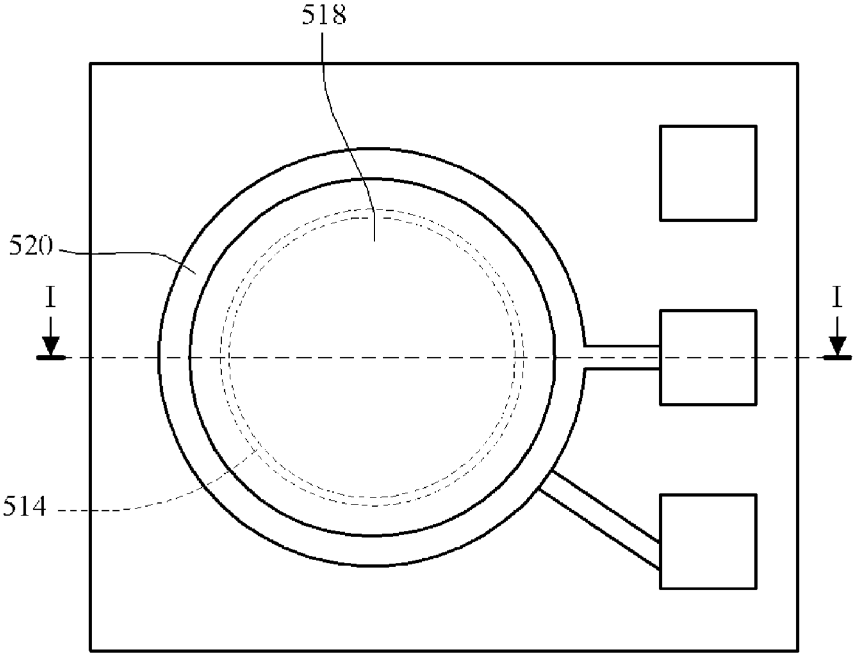
FIG. 5A is a top view of the capacitive microphone of the present invention.
Figure 5B:
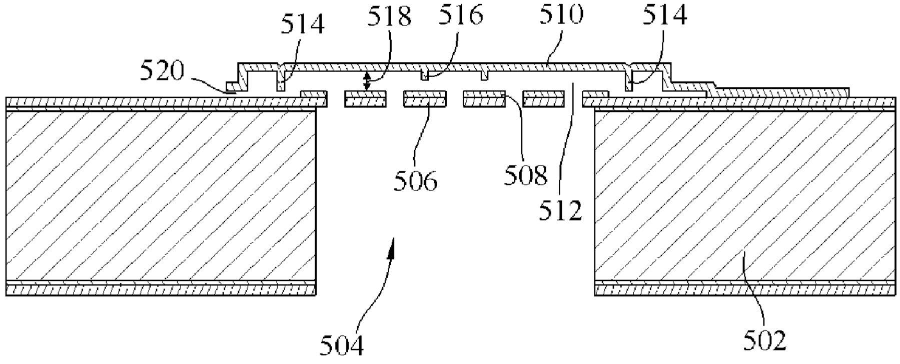
FIG. 5B is a cross-sectional view of FIG. 5A along the line of I-I.

Referring to FIG. 5A, it is a top view of the capacitive microphone of the present invention. FIG. 5B is a cross-sectional view of FIG. 5A along the line of I-I. A substrate 502 with a cavity 504 is included. A backplate 506 is disposed on the substrate 502. And an electrode layer 508 is disposed on the backplate 506. A diaphragm 510 is disposed above the backplate 506. An air gap 512 is formed between the backplate 506 and the diaphragm 510. An annular supporting wall 514 and a dimple 516 are formed on the diaphragm 510. There are a first distance area 518 and a second distance area 520 between the diaphragm 510 and the backplate 506.

Figure 5C:
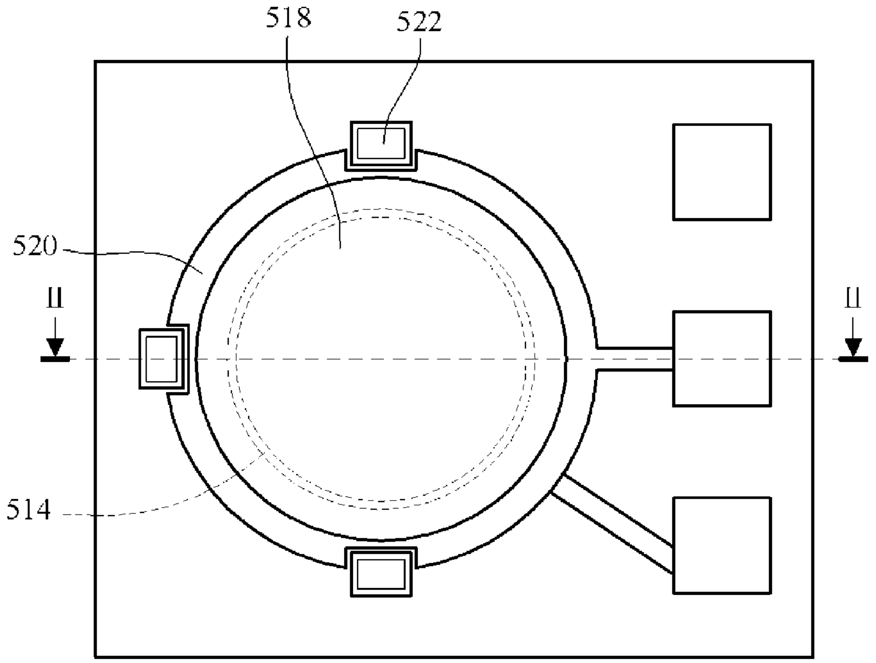
FIG. 5C is a top view of the capacitive microphone with a fastening pile according to the present invention.
Figure 5D:
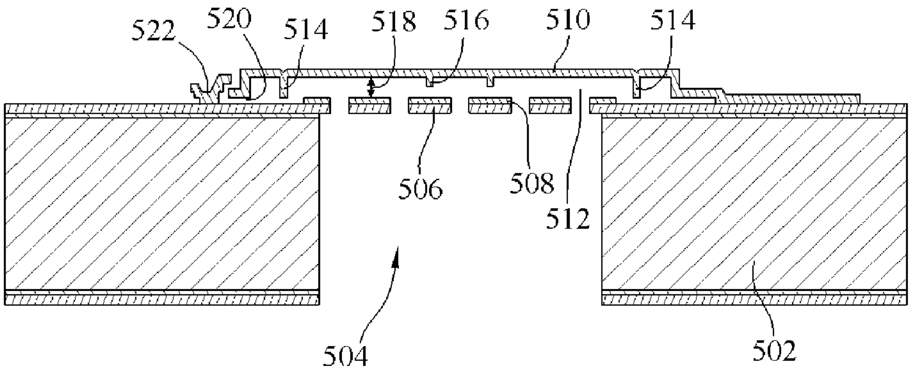
FIG. 5D is a cross-sectional view of FIG. 5C along the line of II-II.

FIG. 5C is a top view of the capacitive microphone with a fastening pile according to the present invention. FIG. 5D is a cross-sectional view of FIG. 5C along the line of II-II, wherein the manufacturing method is the same as that of the first embodiment. The fastening pile 522 is additionally disposed adjacent to the external ring structure, such that the diaphragm 510 with the cap structure cannot drift towards left or right.

Figure 5E:
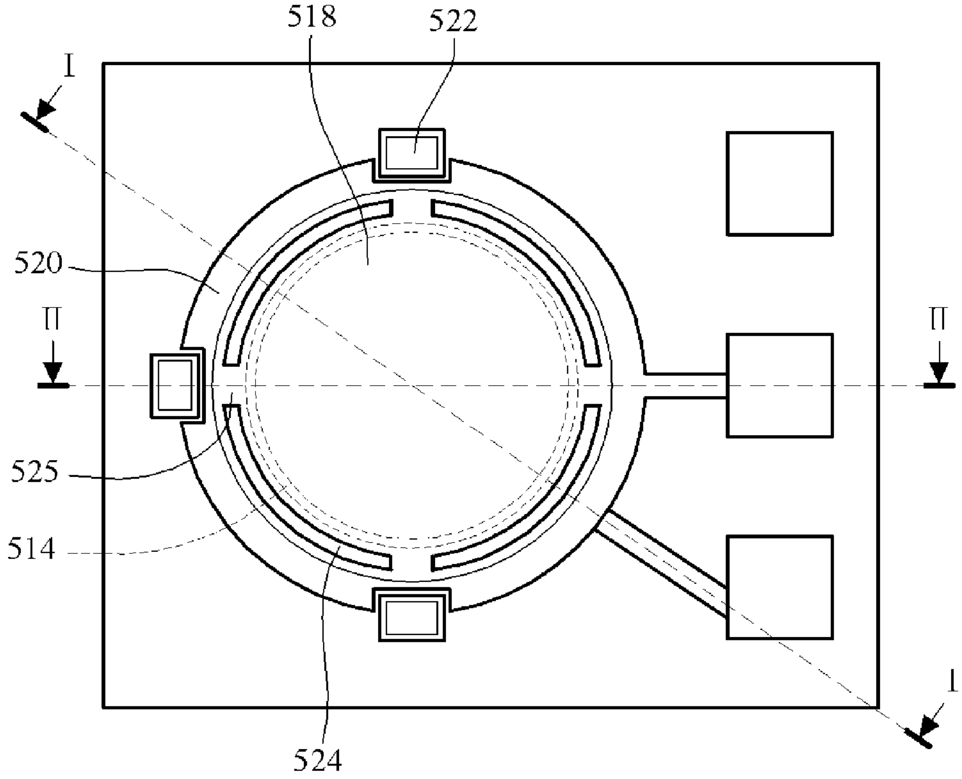
FIG. 5E is a top view of the capacitive microphone with a fastening pile and a slot according to the present invention.
Figure 5F:
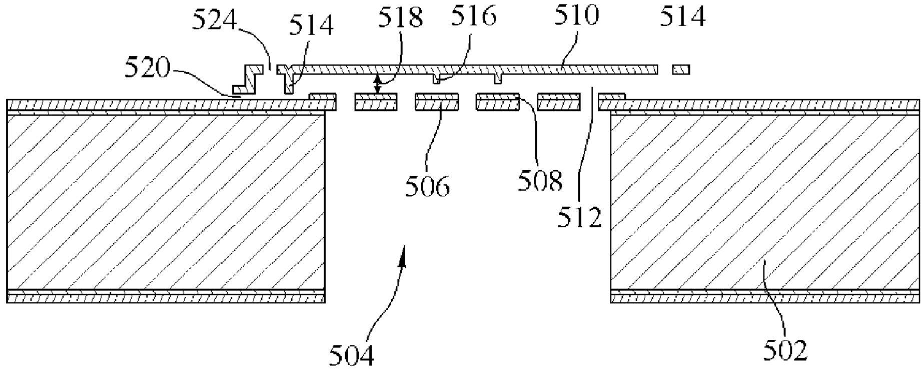
FIG. 5F is a cross-sectional view of FIG. 5E along the line of I-I.
Figure 5G:
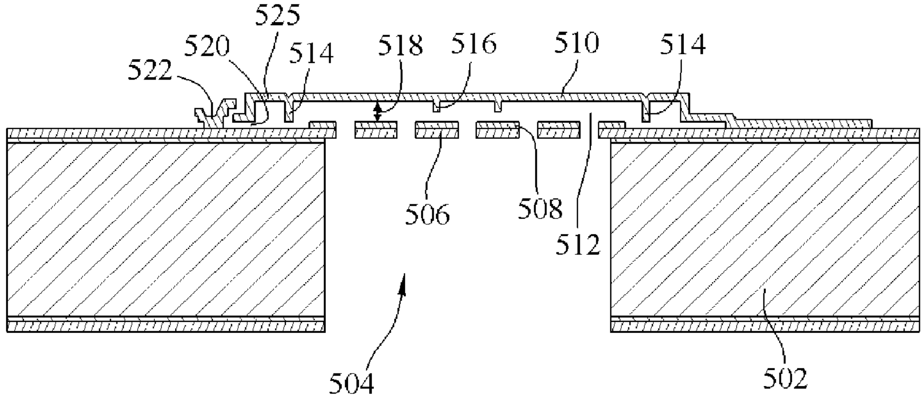
FIG. 5G is a cross-sectional view of FIG. 5G along the line of II-II.

Finally, referring to FIG. 5E, it is a top view of the capacitive microphone with a fastening pile and a slot according to the present invention. FIG. 5F is a cross-sectional view of FIG. 5E along the line of I-I. FIG. 5G is a cross-sectional view of FIG. 5G along the line of II-II, wherein the manufacturing method is the same as that of the first embodiment. Here, the slot 524 is additionally disposed around the diaphragm 510, so as to balance the static pressure. Due to the slot 524 additionally disposed on the diaphragm 510, the diaphragm 510 and the external ring structure of the lower part of the diaphragm 510 are made into the spring coupling 525. Therefore, the annular supporting wall 514 of the diaphragm 510 and the electrode layer 508 contact each other much more smoothly.

The present invention provides a capacitive microphone structure, which can be manufactured by the basic surface micromachining. With a particular external ring structure, the diaphragm can be re-fastened onto the substrate after the remaining stress is totally released. With the particular external ring structure, the diaphragm can be automatically re-fastened onto the substrate after the remaining stress is totally released. And since the remaining stress of the diaphragm has been totally released the elements will not be affected by the remaining stress that varies during the manufacturing process. Therefore, the manufacturing process is relatively simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a capacitive microphone, comprising:

providing a substrate having at least one cavity;

forming a backplate on the substrate, wherein the backplate has a plurality of holes;

forming a diaphragm on the backplate, wherein there are a first distance and a second distance between the diaphragm and the backplate;

forming an air gap between the backplate and the diaphragm through the first distance;

fastening the diaphragm to the backplate through the second distance; and forming a supporting wall structure on the diaphragm, wherein the supporting wall structure and the backplate are fastened through an electrostatic adhesion generated by an applied bias, and the second distance between the diaphragm and the backplate is reduced to a distance for generating a surface stiction.

2. The method of manufacturing the capacitive microphone of claim 1, wherein the first distance is greater than the second distance.

3. The method of manufacturing the capacitive microphone of claim 1, wherein the substrate is a silicon wafer.

4. The method of manufacturing the capacitive microphone of claim 3, wherein the cavity is shaped like a hollow.

5. The method of manufacturing the capacitive microphone of claim 4, wherein the hollow is a vertical round hollow or an inclined surface square hollow.

6. The method of manufacturing the capacitive microphone of claim 1, wherein the at least one cavity is manufactured by Inductive Couple Plasma (ICP) dry etching or silicon anisotropy wet etching.

7. The method of manufacturing the capacitive microphone of claim 1, wherein the air gap is formed by wet etching.

8. The method of manufacturing the capacitive microphone of claim 1, after the step of forming the backplate on the substrate, further comprising a step of forming an electrode layer on the backplate.

9. The method of manufacturing the capacitive microphone of claim 1, further comprising a first distance area and a second distance area between the diaphragm and the backplate, and further comprising a step of forming a slot between the first distance area and the second distance area of the diaphragm, to balance a static pressure.

10. The method of manufacturing the capacitive microphone of claim 1, further comprising a first distance area and a second distance area between the diaphragm and the backplate, and further comprising a step of forming a dimple on the first distance area of the diaphragm, to reduce the probability of sticking to the backplate.

11. The method of manufacturing the capacitive microphone of claim 10, wherein a length of the dimple is smaller than the first distance.

12. The method of manufacturing the capacitive microphone of claim 1, further comprising a step of forming a fastening pile at a periphery of the diaphragm for ensuring the relative position of the diaphragm and the backplate.

13. The method of manufacturing the capacitive microphone of claim 1, wherein the diaphragm is made of conductive materials.

14. The method of manufacturing the capacitive microphone of claim 1, wherein a step-shaped difference is formed by the first distance and the second distance between the diaphragm and the backplate.

15. The method of manufacturing the capacitive microphone of claim 1, further comprising a step of drying by using a super criticality of $CO_2$, to remove the moisture of the capacitive microphone.

16. A method of manufacturing a capacitive microphone, comprising:

providing a substrate having at least one cavity;

forming a backplate on the substrate, wherein the backplate has a plurality of holes;

forming a diaphragm on the backplate, wherein there are a first distance and a second distance between the diaphragm and the backplate;

forming an air gap between the backplate and the diaphragm through the first distance;

fastening the diaphragm to the backplate through the second distance; and applying a bias on the substrate under a controlling atmosphere, to bring about a surface stiction between the diaphragm and the backplate.

* * * * *